United States Patent [19]
DeGraaf

[11] Patent Number: 5,819,201
[45] Date of Patent: Oct. 6, 1998

[54] NAVIGATION SYSTEM WITH VEHICLE SERVICE INFORMATION

[75] Inventor: Brent L. DeGraaf, Canton, Mich.

[73] Assignee: Magellan Dis, Inc., Rochester Hills, Mich.

[21] Appl. No.: 713,625

[22] Filed: Sep. 13, 1996

[51] Int. Cl.$^6$ .............................. G06G 7/78; G06F 7/70
[52] U.S. Cl. .............................. 701/208; 701/29; 701/30; 701/211; 340/457.4; 340/309.15; 364/569; 73/178 R
[58] Field of Search .................................. 701/30, 29, 1, 701/200, 208, 212, 209, 201, 207, 211, 210, 117; 340/309.15, 349, 457.4, 457; 73/178 R, 112, 117.3; 364/550, 551.01, 569

[56] References Cited

U.S. PATENT DOCUMENTS

| | | | |
|---|---|---|---|
| 4,244,514 | 1/1981 | Nomura et al. | 701/201 |
| 4,523,283 | 6/1985 | Muhlberger et al. | 701/99 |
| 4,533,900 | 8/1985 | Muhlberger et al. | 701/30 |
| 4,739,482 | 4/1988 | Wrigge | 701/30 |
| 4,796,189 | 1/1989 | Nakayama et al. | 701/209 |
| 4,862,393 | 8/1989 | Reid et al. | 701/30 |
| 4,884,054 | 11/1989 | Moon, Sr. | 701/30 |
| 5,168,451 | 12/1992 | Bolger | 701/117 |
| 5,243,528 | 9/1993 | Lefebvre | 701/211 |
| 5,359,527 | 10/1994 | Takanabe et al. | 701/209 |
| 5,359,529 | 10/1994 | Snider | 701/210 |
| 5,406,492 | 4/1995 | Suzuki | 701/211 |
| 5,410,485 | 4/1995 | Ichikawa | 701/209 |
| 5,508,931 | 4/1996 | Snider | 701/207 |

*Primary Examiner*—Jacques H. Louis-Jacques
*Attorney, Agent, or Firm*—Howard & Howard

[57] ABSTRACT

The navigation system has a display for displaying vehicle service reminders and an input device to permit the driver to define vehicle service intervals. A wheel speed sensor continuously inputs distance data into a CPU. A GPS system receiver continuously inputs date and time data into the CPU. The CPU compares the time and distance data to user defined vehicle service intervals. When the time or distance have exceeded the user defined vehicle service intervals, the CPU generates a vehicle service reminder on the display. The driver can then request the navigation system to guide the driver to an appropriate vehicle service location.

23 Claims, 5 Drawing Sheets

NAVIGATION SYSTEM WITH VEHICLE SERVICE INFORMATION

BACKGROUND OF THE INVENTION

This invention relates generally to on-board vehicle navigation systems, and more particularly to a navigation and positioning system which includes user-definable vehicle service information and reminders.

Proper maintenance, including oil changes, tune-ups and other service, is required at regular intervals to maximize the useful life of the vehicle and improve the vehicles efficiency and performance. In order to assist vehicle owners and encourage proper maintenance, many current vehicles include service reminders. Generally these service reminders comprise a light or other indicator on the dashboard which indicates when a predetermined interval on the odometer has elapsed. These current reminders are limited in several ways. First, the service reminder only reminds the driver that service is required after the predetermined interval has been exceeded. If the interval has not been exceeded the driver cannot determine the miles remaining until the next service requirement.

Further, these service reminders are not user definable. Many users have different needs and preferences for service reminders. For example, oil change reminders would vary according to driving habits. Some drivers need to change their oil more frequently depending on driving habits and driving conditions. Other drivers who drive very little may need to change their oil after an elapsed period of time, before the predetermined distance interval is exceeded.

SUMMARY OF THE INVENTION

The present invention provides a vehicle navigation and positioning system which includes user-definable vehicle service information. The vehicle navigation and positioning system already includes many of the necessary elements. For example, the vehicle navigation system already includes an advanced graphical user interface, including a high resolution display, and user inputs, such as a keyboard and/or mouse. Further, the positioning system receives all the necessary information, such as travelled distance and elapsed time. The time on the positioning system is always accurate and will not be reset by a disconnected battery because the time is received from the Global Positioning System. Further, all the user defined values and intervals will be continuously stored in the navigation system's non-volatile flash memory, even if the battery is disconnected from the car.

The user selects and modifies vehicle service intervals for both time and distance for several types of vehicle maintenance utilizing the mouse and display. The CPU monitors the elapsed time and distance travelled with respect to the vehicle service intervals and generates a vehicle service reminder when the elapsed time or distance travelled meet or exceed one of the vehicle service intervals. The user can then request the navigation system to guide the user to an appropriate vehicle service location.

BRIEF DESCRIPTION OF THE DRAWINGS

The above, as well as other advantages of the present invention, will become readily apparent to those skilled in the art from the following detailed description of the preferred embodiment when considered in light of the accompanying drawings in which.

DETAILED DESCRIPTION OF A PREFERRED EMBODIMENT

Figure 1:
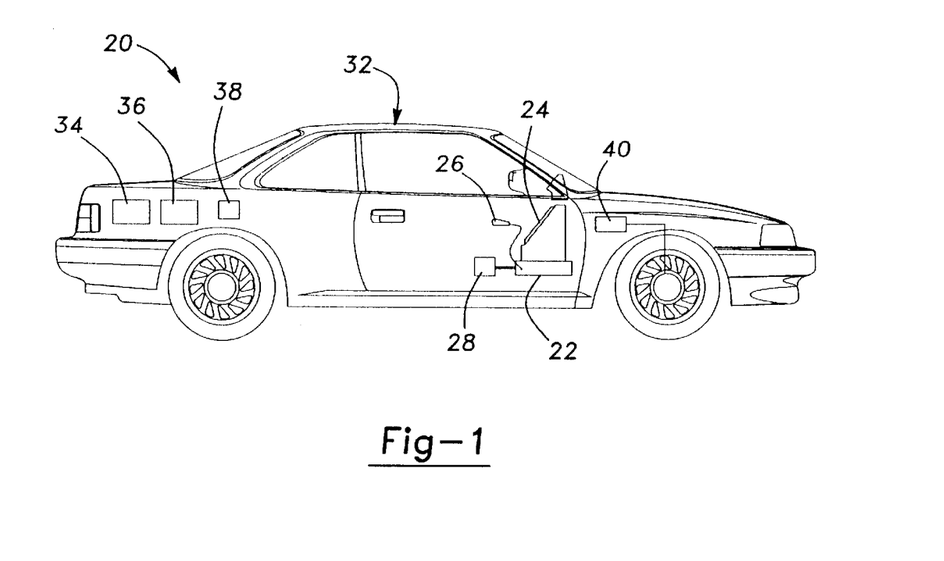
FIG. 1 is a schematic of the navigation system of the present invention installed in a vehicle.

The navigation system 20 of the present invention is shown schematically in FIG. 1. The navigation system 20 includes a CPU 22 connected to a display 24, such as a high resolution LCD or flat panel display. The CPU 22 is also connected to an input device 26, such as a mouse, joystick or keyboard. Alternatively, the display 24 can be a touch screen display. The navigation system 20 further includes a database 28 connected to the CPU 22. The database 28 is a mass media storage device, such as a CD ROM which includes a map of all the roads in the area to be traveled by the user. The navigation system 20 is shown installed in a vehicle 32 having position determining devices, including a GPS system receiver 34, a gyroscope 36, a compass 38, and a wheel speed sensor 40 all connected to the CPU 22 [connections not shown for simplicity]. Such position determining devices are well known and are commercially available. Preferably, a combination of these position determining devices is utilized. The wheel speed sensor 40 inputs distance travel information to the CPU 22 for purposes of measuring the distance travelled by the vehicle. Further, as part of the GPS system, the GPS system receiver 34 receives a signal indicating to a high degree of accuracy, the current time and date. This date and time information are also input to the CPU 22 for purposes of measuring elapsed time.

Figure 2:
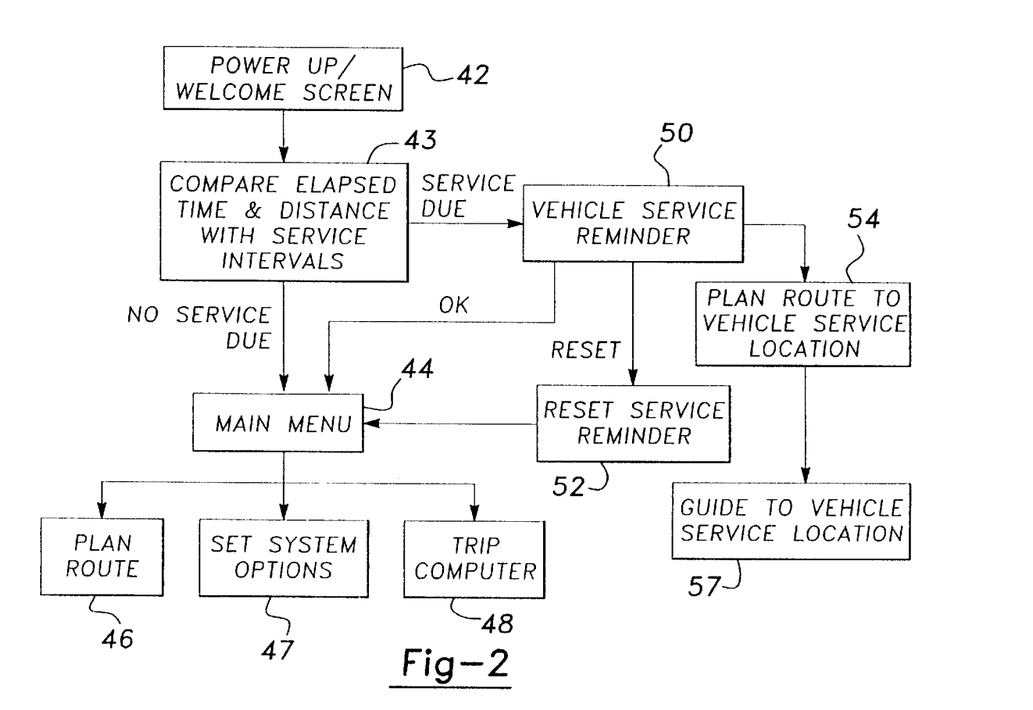
FIG. 2 is a flow chart of the initial operation of the navigation system of FIG. 1.

The operation of the navigation system 20 is shown in FIG. 2. At powerup 42, the CPU 22 compares the elapsed time with a set of vehicle service time intervals for oil changes, tune-ups, or major service in step 43. The CPU 22 also compares the distance travelled by the vehicle with a corresponding set of vehicle service distance intervals. If the elapsed time or travelled distance does not exceed one of the vehicle service intervals, the display 24 displays a welcome screen to the driver and then displays the main menu 44, which informs the driver that he may elect to plan a route 46, set systems options 47, or select the trip computer 48.

If the CPU 22 determines that vehicle service is due, the display 24 displays a vehicle service reminder in step 50. The driver can acknowledge the reminder and return to the main menu 44 or can elect to reset the service reminder 52, returning the elapsed time and travelled distance to zero. Further, the driver can elect to have the navigation system 20 plan a route to the appropriate vehicle service location 54. The navigation system 20 can then guide the driver to a vehicle service location in step 57. The vehicle service location can be the driver's preferred vehicle service location, the closest location of the driver's preferred service provider, or if the position determining devices determine that the vehicle 32 is away from the driver's home area, the navigation system 20 can list the nearest available vehicle service locations.

Figure 3:
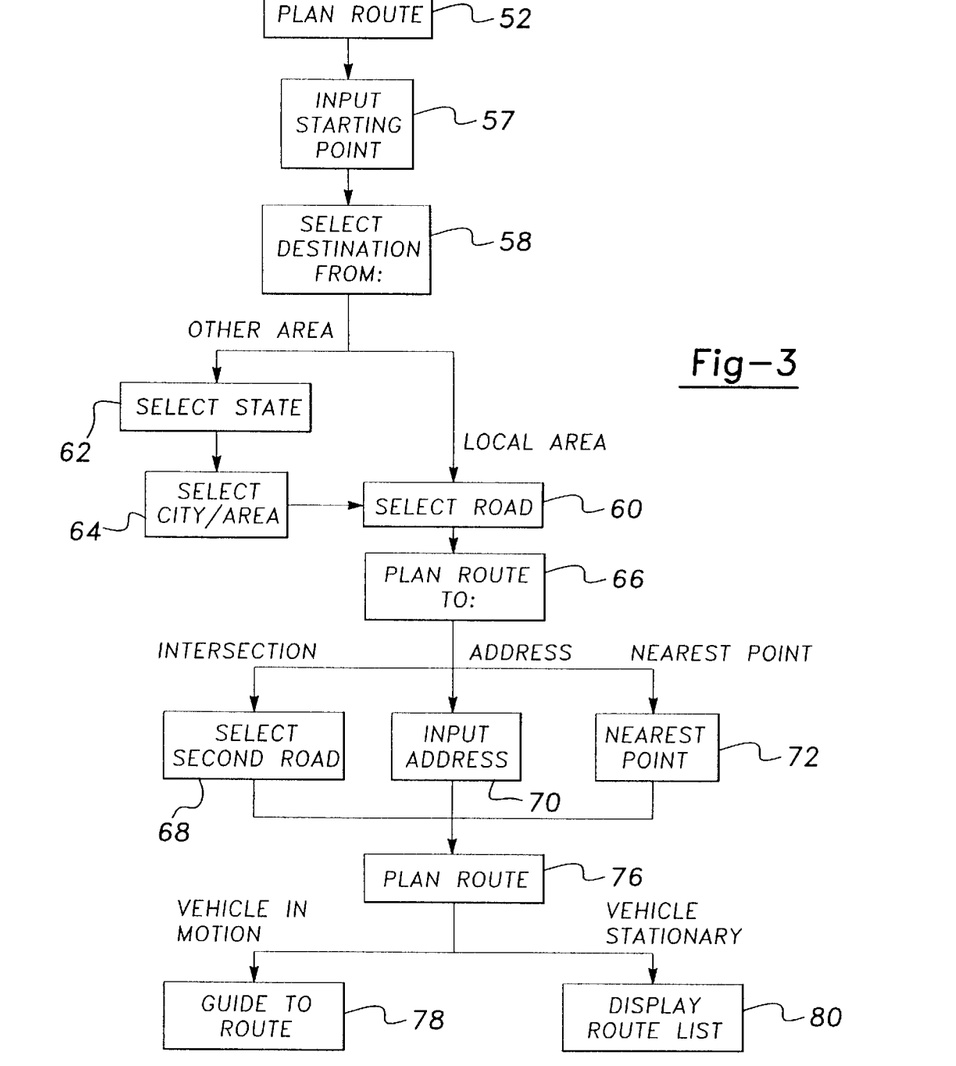
FIG. 3 is a flow chart of the route planning routine of FIG. 2.

Referring to FIG. 3, if the user elects to plan a route 46, the navigation system 20 inputs a starting point relative to the database 28 in step 57. If the navigation system 20 includes position determining devices, the current position of the vehicle 32 is input as the starting point for the route to be planned. In step 58, the user selects a destination from the local area surrounding the current vehicle position or from all areas. If the user wishes to select a destination from a local area, the user selects a road as the destination to which the route will be guided in step 60. Otherwise the driver must first select a state in step 62 and a city or area in step 64. In step 66, the navigation system 20 requests whether to plan the route to a specific intersection of the selective road in step 68, a specific address on the selected road in step 70 or the nearest point on the selected road in step 72.

In step 76, the navigation system 20 plans a route from the starting point to the selected destination utilizing the roads in the database 28. Utilizing well known algorithms present in commercially available navigation systems, the navigation system 20 recommends a route from the starting point to the selected destination. If the vehicle 32 is moving when the route planning routine 76 is completed, the display 24 of the navigation system 20 displays route guidance information in step 78. Preferably, the navigation system 20 displays "turn-by-turn" information to the driver, i.e. the display 24 displays a map of the immediate area showing the present position of the vehicle and the next maneuver in the recommended route. If the vehicle 32 is stationary at the time the route planning routine 76 is complete, the display 24 preferably displays a list of the road segments in the recommended route in step 80. As the user scrolls up and down through the road segments and the recommended route list, a graphical image of the recommended maneuver (i.e. turn right or turn left) is displayed adjacent the route list.

Figure 4:
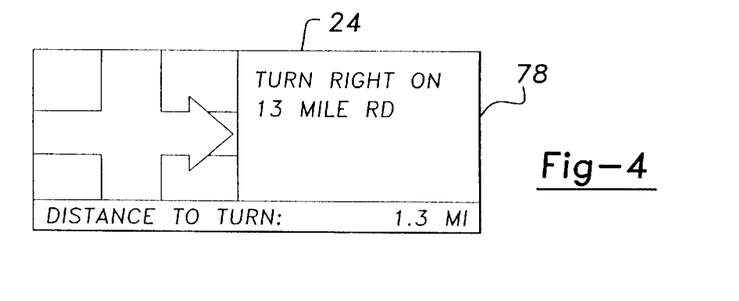
FIG. 4 is a screen of the display of the navigation system of FIG. 1 illustrating a route guidance instruction.

If the vehicle 32 is moving when the route planning routine 76 is complete, the navigation system 20 will then proceed to step 78 where the display 24 will display turn-by-turn route guidance instructions to the driver. As shown in FIG. 4, the display 24 preferably displays a map of the immediate area showing the present position of the vehicle and the next maneuver in the recommended route.

Figure 5:
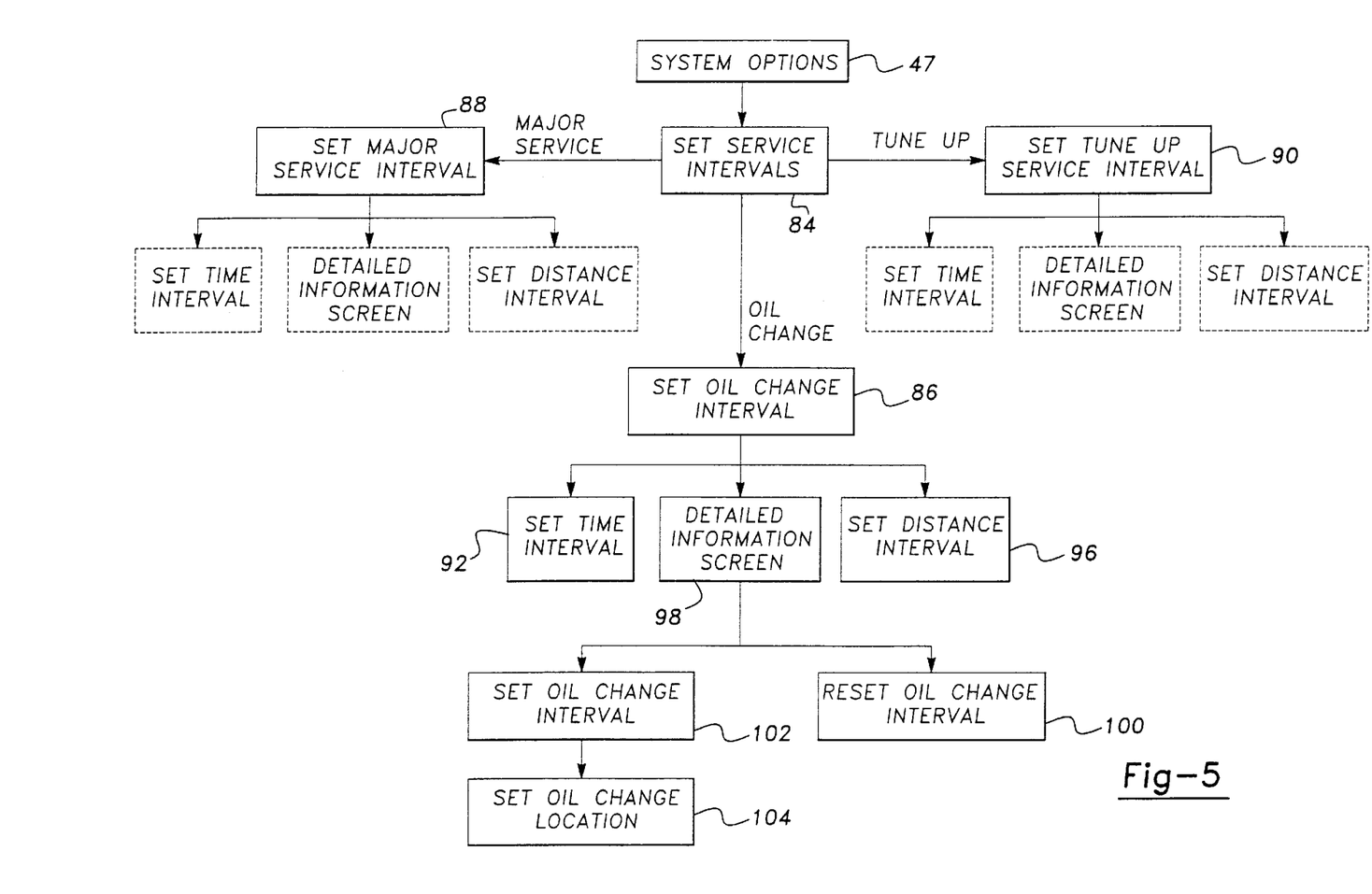
FIG. 5 is a flow chart of the system options routine of FIG. 2.

Referring to FIG. 5, if the user elects to set system options 47, the user can elect to set service intervals 84, among other options (not shown). Although many maintenance intervals could be tracked, the present invention will be described for setting the oil change interval in step 86, setting the major service interval in step 88, and setting the tuneup interval in step 90. If the user selects the oil change interval in step 86, the user can elect to set the time interval in step 92. Preferably, utilizing the mouse 26, the user can increment or decrement the time interval displayed on display 24. Preferably, the time interval is increased by one day or decreased by one day each time the user presses the up or down mouse button, respectively. If the time interval is greater than 90 days, the time interval will begin to increment or decrement in steps of 30 days.

In step 96, the driver can set the distance interval for the oil change vehicle service reminder. Preferably an oil change distance interval is displayed on display 24 and is incremented or decremented by the driver pressing the up or down mouse button, respectively. Preferably the distance interval is incremented by steps of 100 miles until the interval exceeds 1000 miles, when the interval is incremented by 1000 miles steps.

If the user selects the detailed information screen 98, the display 24 will display the complete information for the oil change interval. The display 24 indicates the difference between the set vehicle service intervals and the elapsed time and distance. For example, the display 24 may indicate that oil change service was due 124 miles ago, and that 20 days are left in the time interval. The display 24 may also indicate that certain intervals are not set.

From the detailed information screen 98, the driver can elect to reset the oil change interval, indicating that the oil has been changed, in which case the CPU 22 resets to zero the elapsed time and travelled distance for the oil change reminder. The vehicle service reminder is then set to occur at the next time and distance interval.

Alternatively, if the detailed information screen 98 indicates that an oil change is due, the driver can request the navigation system 20 to route the driver to an oil change location in step 102. In step 104, the navigation system 20 displays turn-by-turn instructions to the driver utilizing display 24 in order to guide the driver in vehicle 32 to an oil change vehicle service location as described above.

The operation of the major service intervals and tune up intervals are set similarly. Further, the driver can select a detailed information screen, reset the vehicle service interval, request a route to an appropriate vehicle service location. The vehicle service locations for major service and tune-ups may be different than those for oil changes.

Figure 6:
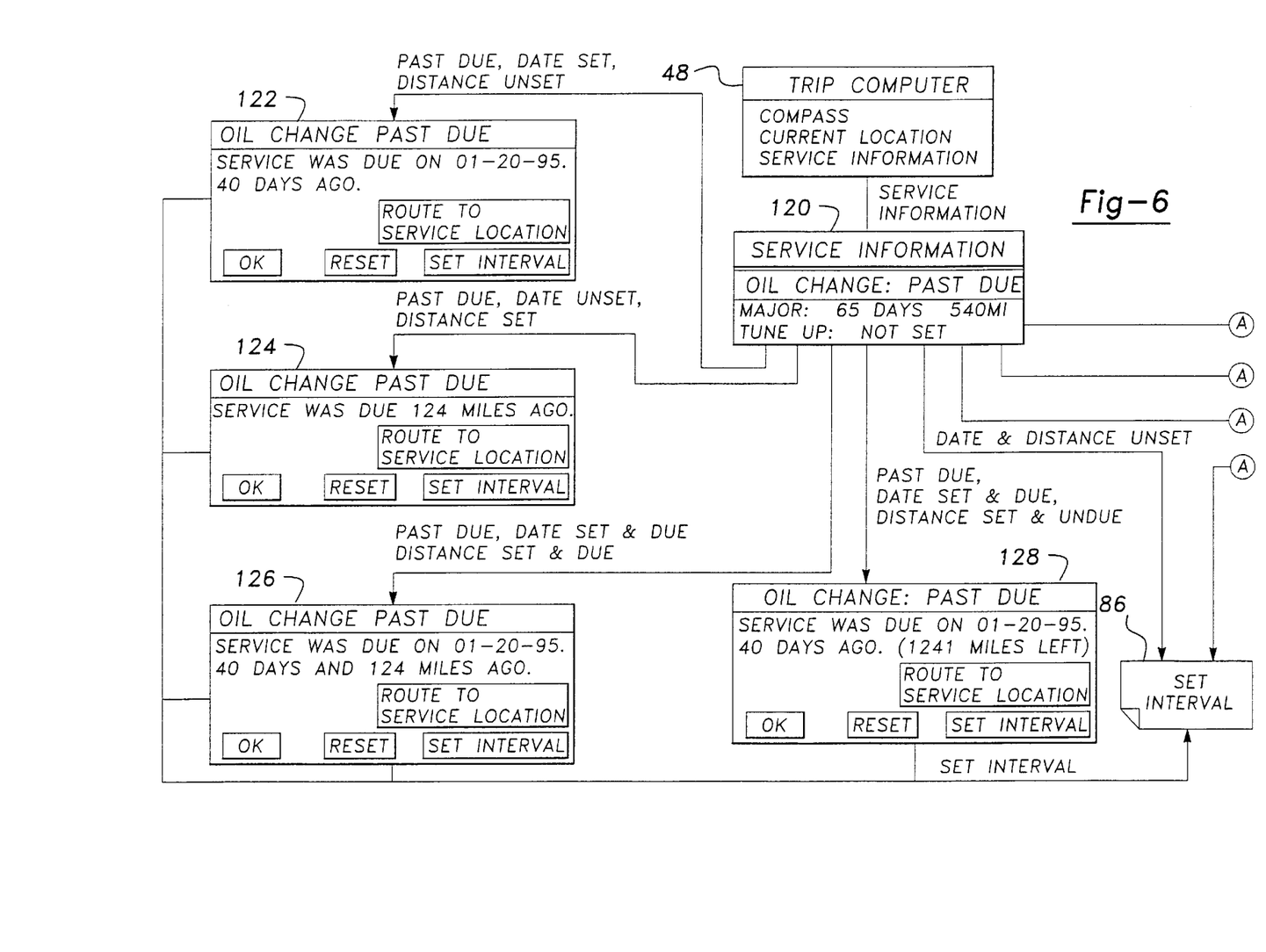
FIG. 6 is a flow chart of the trip computer routine of FIG. 2.

Referring to FIG. 6, if the driver selects the trip computer 48, the driver can select service information 120 from several options. The service information 120 will display the current status of the oil change, major service and tuneup intervals. Step 120 illustrates the display 24 when the oil change is past due, the major service interval is set but not due, and the tuneup interval is not set. Utilizing the mouse 26, the driver can select "oil change" for more detailed service information. Several examples are shown in FIG. 6. Step 122 illustrates the screen of the display 24 when the oil change is past due for the time interval only and the distance interval is not set. Step 124 illustrates the display when the oil change is past due for distance only and the time interval is not set. Step 126 illustrates the display 24 when the oil change is past due for time and distance. Step 128 illustrates the display 24 when the oil change is due based upon date and the distance interval has not been exceeded.

Figure 6A:
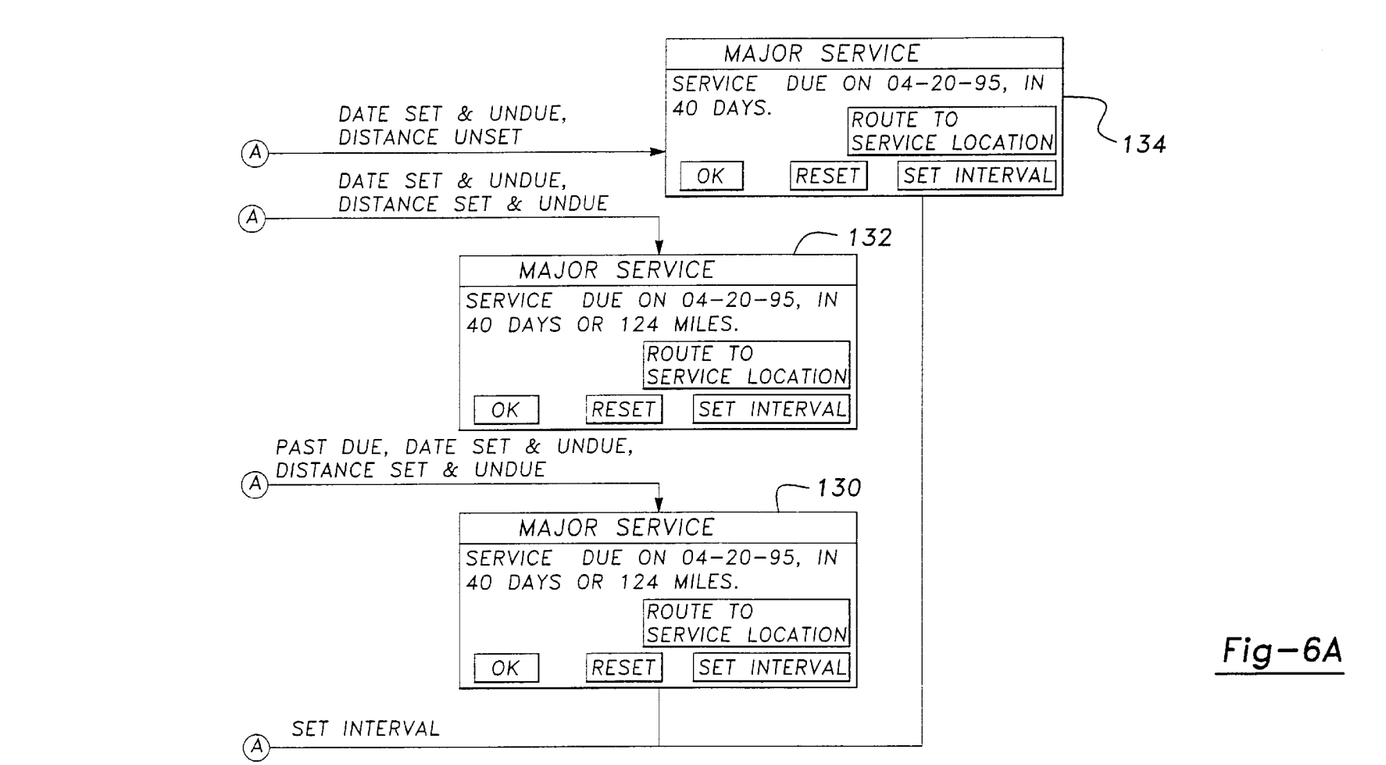
FIG. 6A is a portion of the flow chart of FIG. 6.

Referring to FIG. 6A, step 130 illustrates the display 24 when the oil change is due based upon distance only, but the time interval has not been exceeded. Step 132 illustrates the display 24 after selecting the major service information from step 120 in which the service is not yet due because the time interval and distance interval have not been exceeded.

Step 134 illustrates the display 24 when major service information is selected from step 120 and major service is not yet due and the distance interval is not yet set. For the service information screens 122–134, the driver can elect to reset the service interval, set the service interval, or, request a route to an appropriate vehicle service location. Electing to set the interval returns the navigation system 20 to step 86 in the case of oil changes.

The navigation system 20 of the present invention provides a navigation system with a vehicle service reminder in which the user can set vehicle service reminder time and distance intervals which are appropriate to the vehicle driving conditions. The CPU 22 periodically compares the user defined distance intervals for vehicle service reminders with a distance counter which receives pulses indicating the distance of travel of the vehicle 32 from the wheel speed sensor 40. Further, the GPS system 34 periodically receives highly accurate time data, which is forwarded to the CPU 22 for comparison to the vehicle service time intervals. When the time or distance intervals for a vehicle service reminder is exceeded, the display 24 displays a vehicle service reminder and prompts the driver to request a route to an appropriate vehicle service location.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An in-vehicle navigation system comprising:
   a database of roads to be travelled by a vehicle;
   a user input device for selecting a desired destination for the vehicle relative to said database of roads;
   a system for determining the position of the vehicle relative to said database of roads;
   a system for displaying said position of the vehicle;
   a system for determining a route from said database of roads between a position of the vehicle to said desired destination;
   a system for displaying said route to a user;
   said system for determining said position of the vehicle including a system for measuring the distance travelled by the vehicle;
   a system for displaying a vehicle service reminder based upon a comparison of said distance travelled as determined by said system for measuring the distance travelled and a vehicle service distance interval.

2. The in-vehicle navigation system of claim 1 wherein said system for displaying a vehicle service reminder includes storage for said vehicle service interval and a system for modifying said vehicle service interval based upon a signal from said user input device.

3. The in-vehicle navigation system of claim 1 further including:
   a system for selecting a vehicle service destination from said database; and
   a system for determining a route from said position of the vehicle to said vehicle service destination.

4. The in-vehicle navigation system of claim 1 further including:
   a system for determining elapsed time; and
   a system for displaying said vehicle service reminder when said elapsed time exceeds a vehicle service time interval.

5. The in-vehicle navigation system of claim 4 wherein said system for determining said position of the vehicle includes a time information receiver, said system for determining elapsed time monitoring said time information.

6. An in-vehicle navigation system comprising:
   a database of roads to be traveled by the vehicle;
   a user input device for selecting a desired destination for the vehicle relative to said database of roads and for inputting a user-defined distance service interval;
   a system for measuring the distance travelled by a vehicle;
   a system for determining the position of the vehicle relative to said database based upon said distance travelled;
   system for comparing said distance travelled by the vehicle to said distance service interval;
   a system for determining a route from said database of roads between said position of the vehicle to said destination; and
   a system for displaying a vehicle service reminder generated based upon said comparison of said distance travelled by the vehicle to said disc service interval along with the determined route from said database of roads.

7. The in-vehicle navigation system of claim 6 wherein said system for determining said position of the vehicle includes a time information receiver, said navigation system further including:
   a system for determining elapsed time, said system for determining elapsed time monitoring said time information; and
   said system for displaying displays said vehicle service reminder based upon a comparison of said elapsed time and a vehicle service time interval.

8. The in-vehicle navigation system of claim 7 further including a system for inputting a user-defined time service interval.

9. The in-vehicle navigation system of claim 6 wherein said system for displaying said vehicle service reminder includes storage for said vehicle service interval and a system for modifying said vehicle service interval based upon a signal from said user input device.

10. The in-vehicle navigation system of claim 6 further including:
    a system for selecting a vehicle service destination from a database of roads; and
    a system for determining a route from said position of the vehicle to said vehicle service destination.

11. The in-vehicle navigation system of claim 6 further including:
    a system for determining elapsed time; and
    said system for displaying displays said vehicle service reminder when said elapsed time exceeds a vehicle service time interval.

12. A method for scheduling vehicle service including the steps of:
    measuring a distance travelled by the vehicle;
    defining a distance service interval;
    storing said distance service interval;
    receiving a signal from a position-determining device;
    utilizing said signal to determine the position of the vehicle relative to a database of roads;
    utilizing said signal to measure the distance traveled the vehicle; and
    generating a vehicle service reminder based upon a comparison of said distance traveled by the vehicle and said distance service interval.

13. The method for scheduling vehicle service of claim 12, further including the steps of:
    measuring elapsed time;
    defining a time service interval;
    storing said time service interval;
    modifying said time service interval;
    comparing said elapsed time to said time service interval; and
    generating a vehicle service reminder based upon a comparison of said elapsed time and said time service interval.

14. The method for scheduling vehicle service of claim 13, further including the step of displaying the difference between said elapsed time and said vehicle service time interval.

15. The method for scheduling vehicle service of claim 13, further including the steps of:

determining the position of a vehicle service location when said distance travelled exceeds said distance service interval;

indicating said position of the vehicle relative to said database of roads;

determining a route from said database of roads between said position of the vehicle to said vehicle service location; and generating said route to said vehicle service location.

16. The method for scheduling vehicle service of claim 12 further including the steps of:

receiving a time signal from said position-determining device;

utilizing said time signal to measure elapsed time;

utilizing said time signal to determine the position of the vehicle relative to said database of roads;

comparing said elapsed time to a time service interval; and generating a vehicle service reminder based upon a comparison of said elapsed time and said time service interval.

17. The method for scheduling vehicle service of claim 12, further including the step of displaying the difference between said distance travelled by the vehicle and said vehicle service distance interval.

18. A vehicle navigation and service reminder system comprising:

a vehicle navigation system determining a position of the vehicle relative to a database of roads, said navigation system determining a distance travelled by the vehicle based on the determined position of the vehicle;

a user input device for selecting a desired destination relative to said database of roads;

a system for determining a route from said database of roads from said determined position of the vehicle to said desired destination a vehicle service reminder generated based upon a comparison of a distance service interval and said distance travelled as determined by said navigation system; and a system for displaying said position of the vehicle, said determined route and said vehicle service reminder.

19. The vehicle navigation system of claim 18 wherein said vehicle navigation system determined distance travelled from a distance signal received from a position determining device.

20. The vehicle navigation system of claim 19 wherein said vehicle navigation system determines position based upon said distance signal.

21. The vehicle navigation system of claim 18 further including:

a system for selecting a vehicle service destination from said database of roads; and a system for determining a route from said position of the vehicle to said vehicle service destination.

22. The vehicle navigation system of claim 18 wherein said navigation system further includes:

a time information receiver receiving time information, said navigation system utilizing said time information to determine said position of the vehicle; and said vehicle service reminder generated based upon a comparison of said time information and a vehicle service time interval.

23. The vehicle navigation system of claim 21 wherein said time information receiver is part of a GPS system.

* * * * *

US005819201C1

(12) EX PARTE REEXAMINATION CERTIFICATE (10413th)
United States Patent
DeGraaf (10) Number: US 5,819,201 C1
(45) Certificate Issued: Nov. 24, 2014

(54) NAVIGATION SYSTEM WITH VEHICLE SERVICE INFORMATION

(75) Inventor: Brent L. DeGraaf, Canton, MI (US)

(73) Assignee: Beacon Navigation GmbH, Zug (CH)

Reexamination Request:
No. 90/012,271, Apr. 26, 2012
No. 90/012,382, Jun. 29, 2012

Reexamination Certificate for:
Patent No.: 5,819,201
Issued: Oct. 6, 1998
Appl. No.: 08/713,625
Filed: Sep. 13, 1996

(51) Int. Cl.
*G01C 21/26* (2006.01)
*G07C 5/00* (2006.01)

(52) U.S. Cl.
USPC .............. 701/29.4; 340/309.7; 340/457.4; 700/306; 701/410; 702/165; 702/177; 73/178 R (58) Field of Classification Search
None
See application file for complete search history.

(56) References Cited

To view the complete listing of prior art documents cited during the proceedings for Reexamination Control Numbers 90/012,271 and 90/012,382, please refer to the USPTO's public Patent Application Information Retrieval (PAIR) system under the Display References tab.

*Primary Examiner* — Angela M Lie (57) ABSTRACT

The navigation system has a display for displaying vehicle service reminders and an input device to permit the driver to define vehicle service intervals. A wheel speed sensor continuously inputs distance data into a CPU. A GPS system receiver continuously inputs date and time data into the CPU. The CPU compares the time and distance data to user defined vehicle service intervals. When the time or distance have exceeded the user defined vehicle service intervals, the CPU generates a vehicle service reminder on the display. The driver can then request the navigation system to guide the driver to an appropriate vehicle service location.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 12 and 18 are cancelled.

Claims 2-11, 13-17 and 19-23 were not reexamined.

\* \* \* \* \*